(12) United States Patent
Sloan et al.

(10) Patent No.: US 9,553,990 B2
(45) Date of Patent: Jan. 24, 2017

(54) RECOMMENDED ROSTER BASED ON CUSTOMER RELATIONSHIP MANAGEMENT DATA

(71) Applicant: ORACLE INTERNATIONAL CORPORATION, Redwood Shores, CA (US)

(72) Inventors: Scott Sloan, Berwyn, PA (US); Victor Chung-Wai Chan, Saratoga, CA (US); Christopher Patterson, Los Altos Hills, CA (US); Manish Sharma, Shenzhen (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/724,872

(22) Filed: May 29, 2015

(65) Prior Publication Data

US 2016/0352908 A1    Dec. 1, 2016

(51) Int. Cl.
| | | |
|---|---|---|
| *H04M 3/42* | (2006.01) | |
| *H04M 3/00* | (2006.01) | |
| *H04M 5/00* | (2006.01) | |
| *H04M 3/523* | (2006.01) | |
| *H04M 3/51* | (2006.01) | |
| *H04M 3/56* | (2006.01) | |

(52) U.S. Cl.
CPC ......... *H04M 3/5233* (2013.01); *H04M 3/5191* (2013.01); *H04M 3/563* (2013.01)

(58) Field of Classification Search
CPC ....... H04M 3/58; H04M 3/523; H04M 3/5233
USPC ............ 379/201.01, 265.05, 265.11, 265.12, 379/211.02, 212.01, 204.01
See application file for complete search history.

(56) References Cited

U.S. PATENT DOCUMENTS

| | | | |
|---|---|---|---|
| 7,787,609 B1 | 8/2010 | Flockhart et al. | |
| 8,874,636 B2 * | 10/2014 | Tuchman | G06Q 30/0601 705/1.1 |
| 2010/0091967 A1 * | 4/2010 | Costello | H04M 3/51 379/201.01 |

OTHER PUBLICATIONS

International Application No. PCT/US2016/031189, International Search Report and Written Opinion mailed on Jul. 11, 2016, 12 pages.

* cited by examiner

*Primary Examiner* — Thjuan K Addy
(74) *Attorney, Agent, or Firm* — Kilpatrick Townsend & Stockton LLP

(57) ABSTRACT

Embodiments of the invention provide systems and methods for facilitating collaboration in a contact center by providing a roster of recommended subject matter experts on a topic related to an ongoing customer contact session. For example, embodiments can use a modification of the skills matching algorithm of the CRM system used to initially select an agent to also evaluate the needs of the service incident, and match those needs with people who would be able to contribute to a conversation and help the agent. The system can then recommend these possible contributors in a ranked order based on how well each collaborator's skills match the requirements of the incident. When the agent requires assistance and creates a conversation, the system can recommend to the agent a list of users that can help, based on the strength of the match to the skill that would equate to the incident.

20 Claims, 6 Drawing Sheets

RECOMMENDED ROSTER BASED ON CUSTOMER RELATIONSHIP MANAGEMENT DATA

BACKGROUND OF THE INVENTION

Embodiments of the present invention relate generally to methods and systems for facilitating collaboration in a contact center and more particularly to providing a roster of recommended subject matter experts on a topic related to an ongoing customer contact session.

Customer Relationship Management (CRM) systems or other contact center systems provide support for customers of a product or service by allowing those users to make requests for service that can include a question posed by the user related to the product or service. Generally speaking, these systems receive requests for service, e.g., in the form of a phone call, web page form, instant message, email, etc., and route the requests to a human agent for addressing the request and providing an answer to the question. In ideal cases, the agent is selected based on the topic of the question or request and a predefined profile of that agent that includes indications of the agent's skills and/or expertise. Once the agent has been selected the customer is placed in contact with the agent and an interactive session can be conducted between the agent and customer using any of the available channels, e.g., voice call, chat, web page form, instant message, email, etc.

Some CRM systems also provide a means for an agent to collaborate with others, i.e., other agents or other subject matter experts, while handling the customer contact. In some cases, the system can provide a workspace or a team workspace that provides a way for users to share and collaborate on data for specific purposes. Some examples of such workspaces are forums, white boards in the Internet domain and workspaces in several enterprise applications. In other cases, collaboration between an agent and another agent or other subject matter expert can take the form of a chat, email exchange, or instant messaging. However, all of the above methods require the agent to decide who they should ask for assistance, based on the agent's knowledge of other people's skills and attributes, or based on pre-defined groups. In other words, agents are only as good as the rolodex of people they know or must "get lucky" by reaching out to a large list of people. Hence, there is a need for improved methods and systems for facilitating collaboration in a contact center.

BRIEF SUMMARY OF THE INVENTION

Embodiments of the invention provide systems and methods for providing a roster of recommended subject matter experts on a topic related to an ongoing customer contact session. According to one embodiment, facilitating collaboration in a contact center can comprise initiating a session between a customer contact and a customer service agent in response to a request from the customer. The customer service agent can be selected from a plurality of customer service agents based on incident information related to the request from the customer and skills information for each of the plurality of customer service agents. While conducting the session between the customer contact and the customer service agent, a request to collaborate with a subject matter expert can be received from the customer service agent. In response to receiving the request to collaborate with a subject matter expert, a plurality of subject matter experts can be recommended to the customer service agent based on conducting the session between the customer contact and the customer service agent. The plurality of subject matter experts can comprise customer service agents and/or others.

According to one embodiment, recommending to the customer service agent the plurality of subject matter experts based on conducting the session between the customer contact and the customer service agent can comprise determining current incident information for the session based on conducting the session between the customer contact and the customer service agent and generating an ordered list of the plurality of subject matter experts based on the current incident information for the session and skills information for each of the plurality of subject matter experts. The list can be ordered by a degree of match between the current incident information for the session and skills information for each of the plurality of subject matter experts. The ordered list of the plurality of subject matter experts can be provided to the customer service agent. In response to receiving from the agent a selection of one or more of the recommended subject matter experts, a collaborative session can be conducted between the customer service agent and the selected one or more of the recommended subject matter experts while conducting the session between the customer contact and the customer service agent. In some cases, the skills information for the selected one or more of the recommended subject matter experts can be updated based on a resolution of the session between the customer contact and the customer service agent.

DETAILED DESCRIPTION OF THE INVENTION

Figure 1:
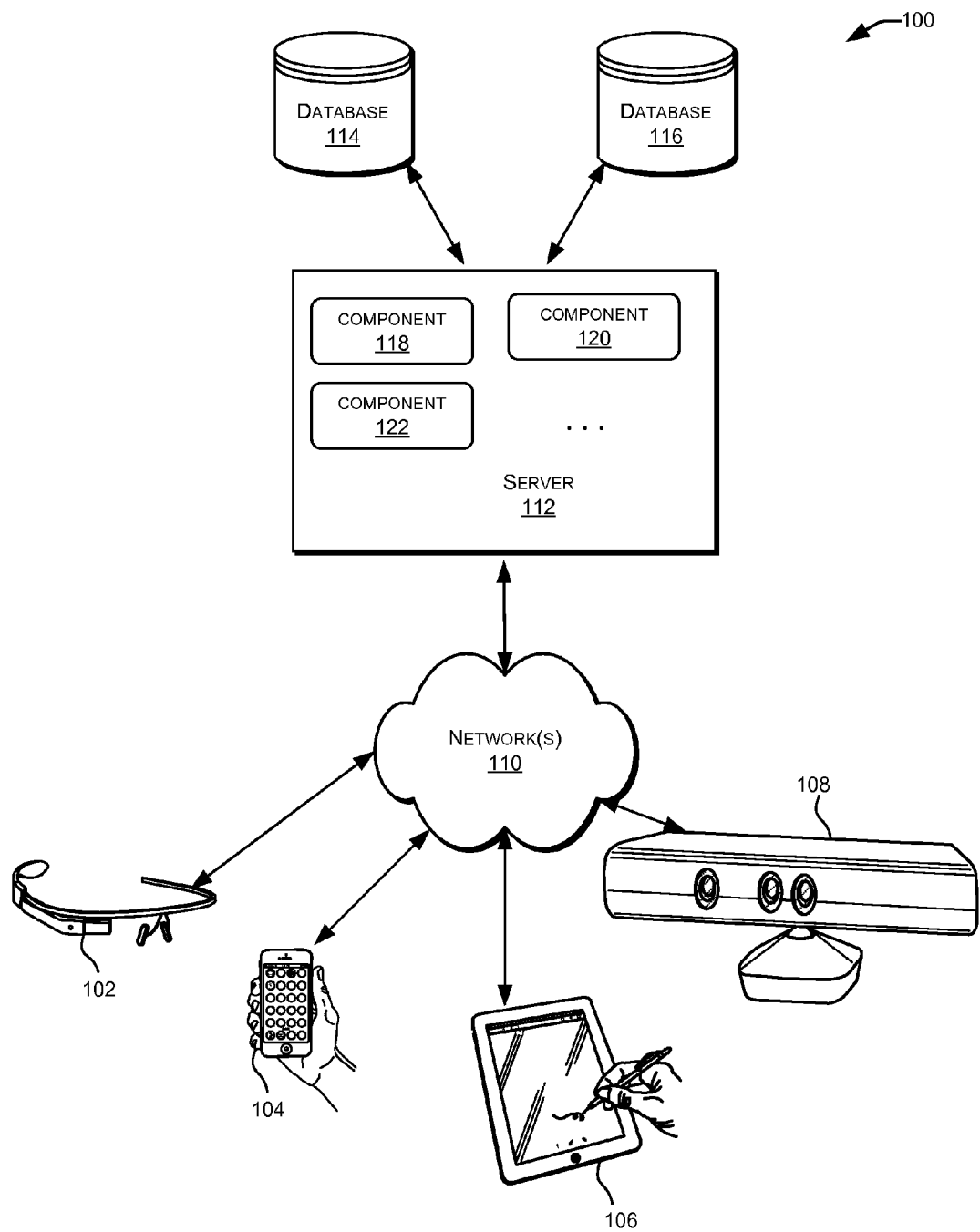
FIG. 1 is a block diagram illustrating components of an exemplary distributed system in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for facilitating collaboration in a contact center. More specifically, embodiments of the present invention provide a roster of recommended subject matter experts on a topic related to an ongoing customer contact session. For example, embodiments can use a modification of the skills matching algorithm of the CRM system used to initially select an agent to also evaluate the needs of the service incident, and match those needs with people who would be able to contribute to a conversation and help the agent. The system can then recommend these possible contributors in a ranked order based on how well each collaborator's skills match the requirements of the incident. The system can evaluate the product and category of a given incident, and provide skills that can be set up for people, matching the product and category combinations. Skill levels can be set by users and/or administrators of the system, according to customer preference. Over time, the system can adjust users' skill levels based on users' contributions to similar incidents. When the agent requires assistance and creates a conversation, the system can recommend to the agent a list of users that can help, based on the strength of the match to the skill that would equate to the incident. In this way, the agent requiring assistance can get significantly better results by reaching out to people that are more likely to be able to help, based on their skills and track record of answering similar types of incidents. Various additional details of embodiments of the present invention will be described below with reference to the figures.

FIG. 1 is a block diagram illustrating components of an exemplary distributed system in which various embodiments of the present invention may be implemented. In the illustrated embodiment, distributed system 100 includes one or more client computing devices 102, 104, 106, and 108, which are configured to execute and operate a client application such as a web browser, proprietary client (e.g., Oracle Forms), or the like over one or more network(s) 110. Server 112 may be communicatively coupled with remote client computing devices 102, 104, 106, and 108 via network 110.

In various embodiments, server 112 may be adapted to run one or more services or software applications provided by one or more of the components of the system. In some embodiments, these services may be offered as web-based or cloud services or under a Software as a Service (SaaS) model to the users of client computing devices 102, 104, 106, and/or 108. Users operating client computing devices 102, 104, 106, and/or 108 may in turn utilize one or more client applications to interact with server 112 to utilize the services provided by these components.

In the configuration depicted in the figure, the software components 118, 120 and 122 of system 100 are shown as being implemented on server 112. In other embodiments, one or more of the components of system 100 and/or the services provided by these components may also be implemented by one or more of the client computing devices 102, 104, 106, and/or 108. Users operating the client computing devices may then utilize one or more client applications to use the services provided by these components. These components may be implemented in hardware, firmware, software, or combinations thereof. It should be appreciated that various different system configurations are possible, which may be different from distributed system 100. The embodiment shown in the figure is thus one example of a distributed system for implementing an embodiment system and is not intended to be limiting.

Client computing devices 102, 104, 106, and/or 108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 102, 104, 106, and 108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 110.

Although exemplary distributed system 100 is shown with four client computing devices, any number of client computing devices may be supported. Other devices, such as devices with sensors, etc., may interact with server 112.

Network(s) 110 in distributed system 100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), such as one based on Ethernet, Token-Ring and/or the like. Network(s) 110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 112 may be adapted to run one or more services or software applications described in the foregoing disclosure. For example, server 112 may correspond to a server for performing processing described above according to an embodiment of the present disclosure.

Server 112 may run an operating system including any of those discussed above, as well as any commercially available server operating system. Server 112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 112 may include one or more applications to analyze and consolidate data feeds and/or event updates received from users of client computing devices 102, 104, 106, and 108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 112 may also include one or more applications to display the data feeds and/or real-time events via one or more display devices of client computing devices 102, 104, 106, and 108.

Distributed system 100 may also include one or more databases 114 and 116. Databases 114 and 116 may reside in a variety of locations. By way of example, one or more of databases 114 and 116 may reside on a non-transitory storage medium local to (and/or resident in) server 112. Alternatively, databases 114 and 116 may be remote from server 112 and in communication with server 112 via a network-based or dedicated connection. In one set of embodiments, databases 114 and 116 may reside in a storage-area network (SAN). Similarly, any necessary files for performing the functions attributed to server 112 may be stored locally on server 112 and/or remotely, as appropriate. In one set of embodiments, databases 114 and 116 may include relational databases, such as databases provided by Oracle, that are adapted to store, update, and retrieve data in response to SQL-formatted commands.

Figure 2:
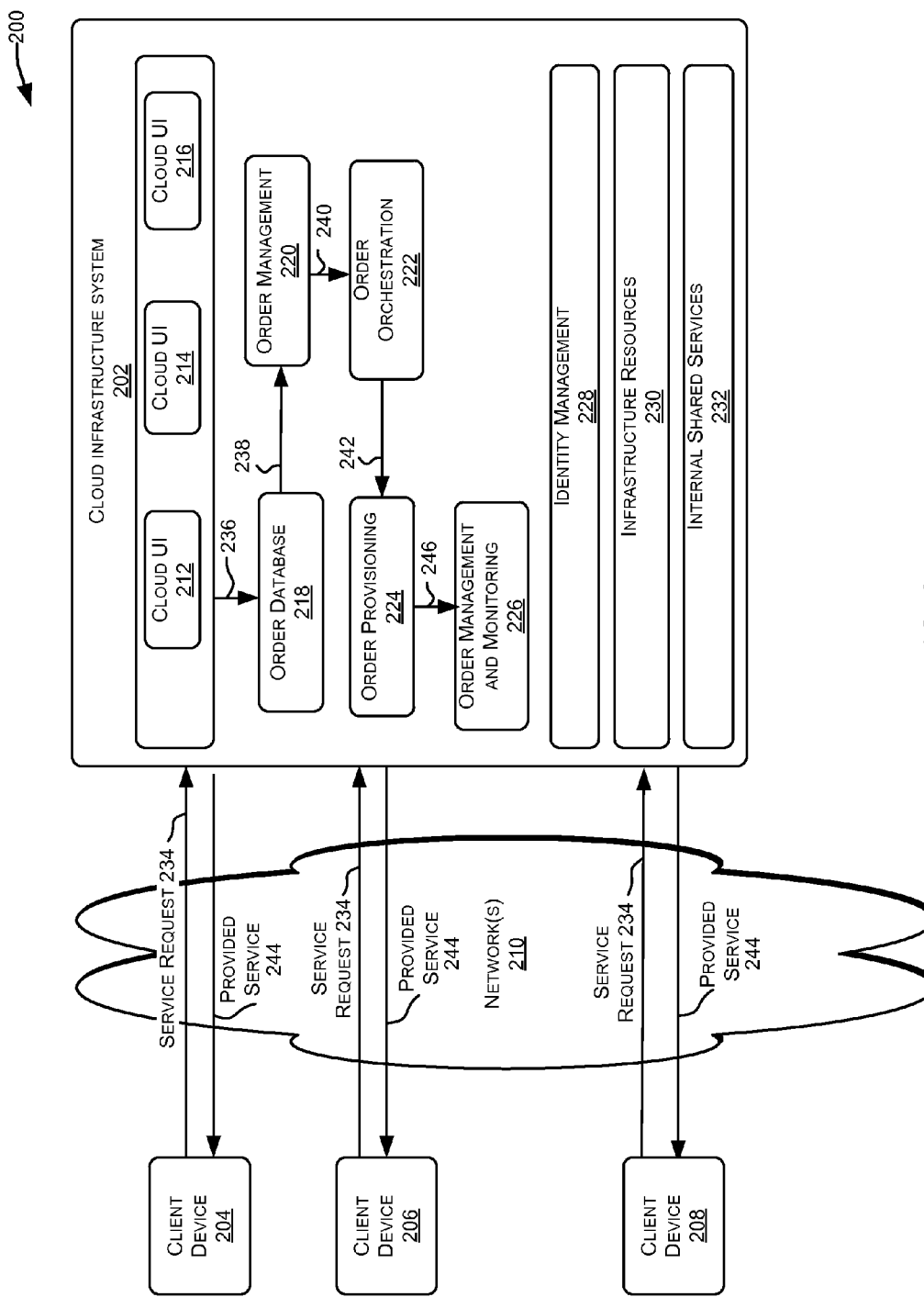
FIG. 2 is a block diagram illustrating components of a system environment by which services provided by embodiments of the present invention may be offered as cloud services.

FIG. 2 is a block diagram illustrating components of a system environment by which services provided by embodiments of the present invention may be offered as cloud services. In the illustrated embodiment, system environment 200 includes one or more client computing devices 204, 206, and 208 that may be used by users to interact with a cloud infrastructure system 202 that provides cloud services. The client computing devices may be configured to operate a client application such as a web browser, a proprietary client application (e.g., Oracle Forms), or some other application, which may be used by a user of the client computing device to interact with cloud infrastructure system 202 to use services provided by cloud infrastructure system 202.

It should be appreciated that cloud infrastructure system 202 depicted in the figure may have other components than those depicted. Further, the embodiment shown in the figure is only one example of a cloud infrastructure system that may incorporate an embodiment of the invention. In some other embodiments, cloud infrastructure system 202 may have more or fewer components than shown in the figure, may combine two or more components, or may have a different configuration or arrangement of components.

Client computing devices 204, 206, and 208 may be devices similar to those described above for 102, 104, 106, and 108.

Although exemplary system environment 200 is shown with three client computing devices, any number of client computing devices may be supported. Other devices such as devices with sensors, etc. may interact with cloud infrastructure system 202.

Network(s) 210 may facilitate communications and exchange of data between clients 204, 206, and 208 and cloud infrastructure system 202. Each network may be any type of network familiar to those skilled in the art that can support data communications using any of a variety of commercially-available protocols, including those described above for network(s) 110.

Cloud infrastructure system 202 may comprise one or more computers and/or servers that may include those described above for server 112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 202 may be adapted to automatically provision, manage and track a customer's subscription to services offered by cloud infrastructure system 202. Cloud infrastructure system 202 may provide the cloud services via different deployment models. For example, services may be provided under a public cloud model in which cloud infrastructure system 202 is owned by an organization selling cloud services (e.g., owned by Oracle) and the services are made available to the general public or different industry enterprises. As another example, services may be provided under a private cloud model in which cloud infrastructure system 202 is operated solely for a single organization and may provide services for one or more entities within the organization. The cloud services may also be provided under a community cloud model in which cloud infrastructure system 202 and the services provided by cloud infrastructure system 202 are shared by several organizations in a related community. The cloud services may also be provided under a hybrid cloud model, which is a combination of two or more different models.

In some embodiments, the services provided by cloud infrastructure system 202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 202. Cloud infrastructure system 202 then performs processing to provide the services in the customer's subscription order.

In some embodiments, the services provided by cloud infrastructure system 202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 202 may also include infrastructure resources 230 for providing the resources used to provide various services to customers of the cloud infrastructure system. In one embodiment, infrastructure resources 230 may include pre-integrated and optimized combinations of hardware, such as servers, storage, and networking resources to execute the services provided by the PaaS platform and the SaaS platform.

In some embodiments, resources in cloud infrastructure system 202 may be shared by multiple users and dynamically re-allocated per demand. Additionally, resources may be allocated to users in different time zones. For example, cloud infrastructure system 230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 232 may be provided that are shared by different components or modules of cloud infrastructure system 202 and by the services provided by cloud infrastructure system 202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 202, and the like.

In one embodiment, as depicted in the figure, cloud management functionality may be provided by one or more modules, such as an order management module 220, an order orchestration module 222, an order provisioning module 224, an order management and monitoring module 226, and an identity management module 228. These modules may include or be provided using one or more computers and/or servers, which may be general purpose computers, specialized server computers, server farms, server clusters, or any other appropriate arrangement and/or combination.

In exemplary operation 234, a customer using a client device, such as client device 204, 206 or 208, may interact with cloud infrastructure system 202 by requesting one or more services provided by cloud infrastructure system 202 and placing an order for a subscription for one or more services offered by cloud infrastructure system 202. In certain embodiments, the customer may access a cloud User Interface (UI), cloud UI 212, cloud UI 214 and/or cloud UI 216 and place a subscription order via these UIs. The order information received by cloud infrastructure system 202 in response to the customer placing an order may include information identifying the customer and one or more services offered by the cloud infrastructure system 202 that the customer intends to subscribe to.

After an order has been placed by the customer, the order information is received via the cloud UIs, 212, 214 and/or 216.

At operation 236, the order is stored in order database 218. Order database 218 can be one of several databases operated by cloud infrastructure system 218 and operated in conjunction with other system elements.

At operation 238, the order information is forwarded to an order management module 220. In some instances, order management module 220 may be configured to perform billing and accounting functions related to the order, such as verifying the order, and upon verification, booking the order.

At operation 240, information regarding the order is communicated to an order orchestration module 222. Order orchestration module 222 may utilize the order information to orchestrate the provisioning of services and resources for the order placed by the customer. In some instances, order orchestration module 222 may orchestrate the provisioning of resources to support the subscribed services using the services of order provisioning module 224.

In certain embodiments, order orchestration module 222 enables the management of business processes associated with each order and applies business logic to determine whether an order should proceed to provisioning. At operation 242, upon receiving an order for a new subscription, order orchestration module 222 sends a request to order provisioning module 224 to allocate resources and configure those resources needed to fulfill the subscription order. Order provisioning module 224 enables the allocation of resources for the services ordered by the customer. Order provisioning module 224 provides a level of abstraction between the cloud services provided by cloud infrastructure system 200 and the physical implementation layer that is used to provision the resources for providing the requested services. Order orchestration module 222 may thus be isolated from implementation details, such as whether or not services and resources are actually provisioned on the fly or pre-provisioned and only allocated/assigned upon request.

At operation 244, once the services and resources are provisioned, a notification of the provided service may be sent to customers on client devices 204, 206 and/or 208 by order provisioning module 224 of cloud infrastructure system 202.

At operation 246, the customer's subscription order may be managed and tracked by an order management and monitoring module 226. In some instances, order management and monitoring module 226 may be configured to collect usage statistics for the services in the subscription order, such as the amount of storage used, the amount data transferred, the number of users, and the amount of system up time and system down time.

In certain embodiments, cloud infrastructure system 200 may include an identity management module 228. Identity management module 228 may be configured to provide identity services, such as access management and authorization services in cloud infrastructure system 200. In some embodiments, identity management module 228 may control information about customers who wish to utilize the services provided by cloud infrastructure system 202. Such information can include information that authenticates the identities of such customers and information that describes which actions those customers are authorized to perform relative to various system resources (e.g., files, directories, applications, communication ports, memory segments, etc.) Identity management module 228 may also include the management of descriptive information about each customer and about how and by whom that descriptive information can be accessed and modified.

Figure 3:
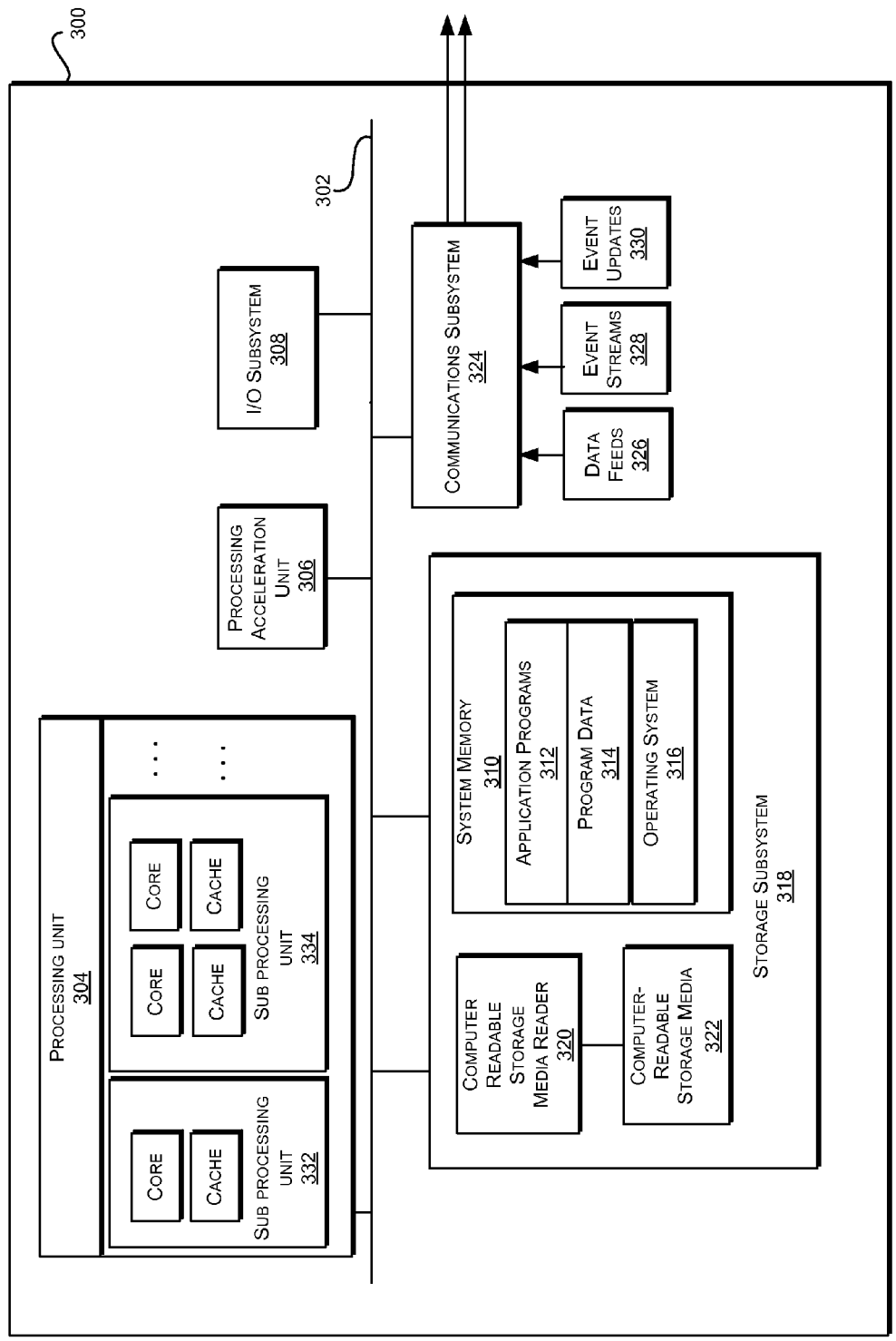
FIG. 3 is a block diagram illustrating an exemplary computer system in which embodiments of the present invention may be implemented.

FIG. 3 is a block diagram illustrating an exemplary computer system in which embodiments of the present invention may be implemented. The system 300 may be used to implement any of the computer systems described above. As shown in the figure, computer system 300 includes a processing unit 304 that communicates with a number of peripheral subsystems via a bus subsystem 302. These peripheral subsystems may include a processing acceleration unit 306, an I/O subsystem 308, a storage subsystem 318 and a communications subsystem 324. Storage subsystem 318 includes tangible computer-readable storage media 322 and a system memory 310.

Bus subsystem 302 provides a mechanism for letting the various components and subsystems of computer system 300 communicate with each other as intended. Although bus subsystem 302 is shown schematically as a single bus, alternative embodiments of the bus subsystem may utilize multiple buses. Bus subsystem 302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 304, which can be implemented as one or more integrated circuits (e.g., a conventional microprocessor or microcontroller), controls the operation of computer system 300. One or more processors may be included in processing unit 304. These processors may include single core or multicore processors. In certain embodiments, processing unit 304 may be implemented as one or more independent processing units 332 and/or 334 with single or multicore processors included in each processing unit. In other embodiments, processing unit 304 may also be implemented as a quad-core processing unit formed by integrating two dual-core processors into a single chip.

In various embodiments, processing unit 304 can execute a variety of programs in response to program code and can maintain multiple concurrently executing programs or processes. At any given time, some or all of the program code to be executed can be resident in processor(s) 304 and/or in storage subsystem 318. Through suitable programming, processor(s) 304 can provide various functionalities described above. Computer system 300 may additionally include a processing acceleration unit 306, which can include a digital signal processor (DSP), a special-purpose processor, and/or the like.

I/O subsystem 308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 300 may comprise a storage subsystem 318 that comprises software elements, shown as being currently located within a system memory 310. System memory 310 may store program instructions that are loadable and executable on processing unit 304, as well as data generated during the execution of these programs.

Depending on the configuration and type of computer system 300, system memory 310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 304. In some implementations, system memory 310 may include multiple different types of memory, such as static random access memory (SRAM) or dynamic random access memory (DRAM). In some implementations, a basic input/output system (BIOS), containing the basic routines that help to transfer information between elements within computer system 300, such as during start-up, may typically be stored in the ROM. By way of example, and not limitation, system memory 310 also illustrates application programs 312, which may include client applications, Web browsers, mid-tier applications, relational database management systems (RDBMS), etc., program data 314, and an operating system 316. By way of example, operating system 316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 318 may also provide a tangible computer-readable storage medium for storing the basic programming and data constructs that provide the functionality of some embodiments. Software (programs, code modules, instructions) that when executed by a processor provide the functionality described above may be stored in storage subsystem 318. These software modules or instructions may be executed by processing unit 304. Storage subsystem 318 may also provide a repository for storing data used in accordance with the present invention.

Storage subsystem 300 may also include a computer-readable storage media reader 320 that can further be connected to computer-readable storage media 322. Together and, optionally, in combination with system memory 310, computer-readable storage media 322 may comprehensively represent remote, local, fixed, and/or removable storage devices plus storage media for temporarily and/or more permanently containing, storing, transmitting, and retrieving computer-readable information.

Computer-readable storage media 322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 300.

By way of example, computer-readable storage media 322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 322 may include, but is not limited to, Zip® drives, flash memory cards, universal serial bus (USB) flash drives, secure digital (SD) cards, DVD disks, digital video tape, and the like. Computer-readable storage media 322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 300.

Communications subsystem 324 provides an interface to other computer systems and networks. Communications subsystem 324 serves as an interface for receiving data from and transmitting data to other systems from computer system 300. For example, communications subsystem 324 may enable computer system 300 to connect to one or more devices via the Internet. In some embodiments communications subsystem 324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 324 can provide wired network connectivity (e.g., Ethernet) in addition to or instead of a wireless interface.

In some embodiments, communications subsystem 324 may also receive input communication in the form of structured and/or unstructured data feeds 326, event streams 328, event updates 330, and the like on behalf of one or more users who may use computer system 300.

By way of example, communications subsystem 324 may be configured to receive data feeds 326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 324 may also be configured to receive data in the form of continuous data streams, which may include event streams 328 of real-time events and/or event updates 330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 324 may also be configured to output the structured and/or unstructured data feeds 326, event streams 328, event updates 330, and the like to one or more databases that may be in communication with one or more streaming data source computers coupled to computer system 300.

Computer system 300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Figure 4:
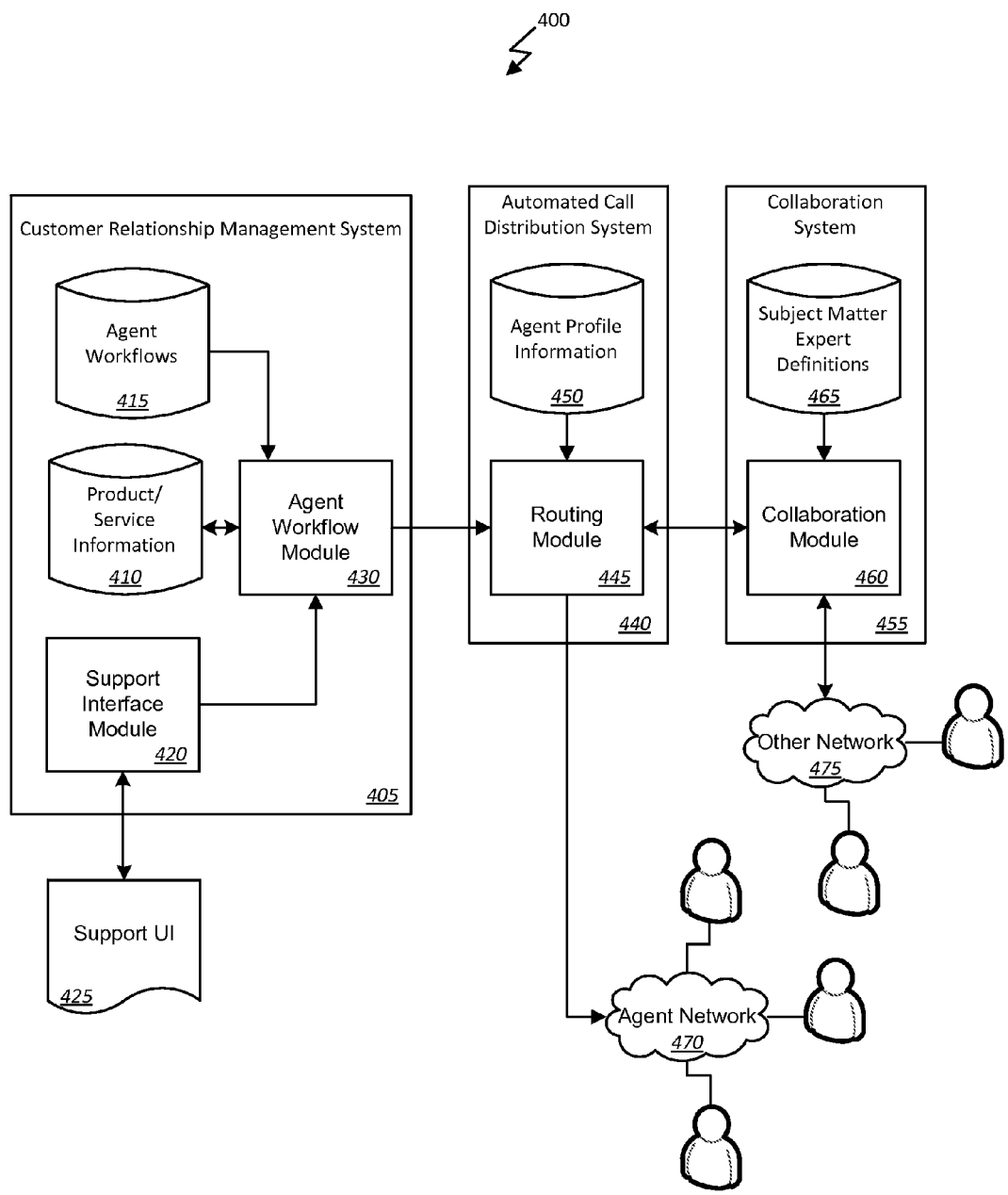
FIG. 4 is a block diagram illustrating, at a high-level, functional components of a system for facilitating collaboration in a contact center according to one embodiment of the present invention.

FIG. 4 is a block diagram illustrating, at a high-level, functional components of a system for facilitating collaboration in a contact center according to one embodiment of the present invention. In this example, the system 400 includes a Customer Relationship Management (CRM) system 405 such as may be executed on a server or another computer or computing device as described above. The CRM system 405 can include information 410 for products and/or services supported by the CRM system 405. The CRM system 405 can also include a set of information defining any number of agent workflows 415. Generally speaking, these workflows 415 can comprise scripts for guiding a customer service agent through performing troubleshooting or other actions when interacting with a customer contact of the CRM system.

The CRM system 405 can support a number of users, such as end users of a product or service, can receive requests for support or service from those users, and process those requests in order to connect or direct the requesting users to one or more agents 470 for answers to questions posed in the requests. For example, a support interface module 425 of the CRM system 405 can provide, through a support interface module 420, one or more interfaces 425 including but not limited to web pages, email addresses, phone lines, chat and/or instant messaging, and/or any of a variety of other communication channels to customer users of the system 400. Through these channels/interfaces 425, the customers can make requests for support that may include questions to be answered by the agents 470.

Once received, these requests and/or customer contacts can be evaluated by the agent workflow module 430 based on the product information 410 to select an agent workflow 415. That is, for a particular product and issue that is the subject of the request or contact, a workflow to be performed, e.g., to troubleshoot a problem, obtain more information, etc., can be selected for performance by a customer service agent. The product information, selected workflow and other information received with the request can be forwarded to a routing module 445 of an Automated Call Distribution (ACD) system 440 which can then direct the request or contact to a selected agent 470 with matching expertise. That is, the routing module 445 can identify an agent with a skillset that is appropriate for the nature of the contact based on a set of stored agent profile information 450 and then connect the customer with that agent through email, phone, chat and/or instant messaging, and/or any of a variety of other communication channels. It should be noted that while illustrated here as separate from the CRM system 405, the ACD system 440 and/or routing module 445 and other components thereof may, in other implementations, be part of the CRM system 405 without departing from the scope of the present invention.

For example, the product information 410 can be organized into a multi-level hierarchy of information with more general product descriptions at the top of the hierarchy and increasing specific product descriptions at lower levels of the hierarchy. For example, a top level of the hierarchy may divide products into "hardware" and "software." A next level down in the hierarchy, for example, might divide "hardware" into product groups like "server," "desktop," and "mobile device." A level below this might further divide these product groups into specific products and thus organizing general and increasingly specific product information into a logical structure. In other words, the structure of the product information 410 can comprise a multi-level hierarchy wherein lower levels of the hierarchy comprise more detailed information about the products or services than higher levels of the hierarchy. These same or similar structures can be used to categorize incidents in the CRM system 405 when a customer contact is received to classify it by product and type of issue (incident type). Additionally or alternatively, the ACD system 440 can model agent skills in the agent profile information using the same or similar structures, i.e., representing skills by product and category. When a user selects or requests through the support interface 425 of the CRM system 405 a chat or other interactive session with an agent, a form of the website or interface 425 can ask the user to be specific as possible about the problem. The customer intent can be determined based on the information received through the interface 425 and can be expressed in the form of a product/category combination to facilitate downstream mapping to agent skills which are best suited to serve this customer. Once the customer's intent is determined, the specific request of the customer, based on the customer intent, can be mapped to an appropriate agent skill even if that skill is mapped further up in the hierarchy of the model. That is, the routing module 445 of the ACD system 40 can select an agent by crawling up the tree(s) of the model defining the agent skills to find the best matched skills for the customer request to find an agent. However, it should be noted that other routing algorithms and methods for modeling product information, customer intent, and/or agent skills are contemplated and considered to be within the scope of the present invention.

The system can also include a collaboration system 455. This collaboration system 455, while illustrated here as separate from the ACD system 440 and CRM system 405 may, depending upon the exact implementation, be supported by the same or different physical or virtual systems operating the other elements illustrated here. Regardless of exactly how or where the collaboration system 455 is implemented, it can provide, through a collaboration module 460, an environment in which an agent handing a customer contact may seek assistance from other agents or other potential experts on the subject matter of the contact/incident. For example, while an agent is handling a customer contact, that agent can request through an agent interface (not shown here) a collaboration session to be launched in order to seek assistance with that contact. According to one embodiment, a list or roster of potential collaborators can be generated and provided to the agent in response to the request so that the agent can quickly and easily select an appropriate subject matter expert to collaborate with. These subject matter experts can be other customer service agents 470 or other users 475 such as developers, managers, etc.

More specifically, embodiments of the present invention provide a roster of recommended subject matter experts on a topic related to an ongoing customer contact session. Embodiments can use the skills matching algorithm of the routing module 445 which was used to initially select the agent to also evaluate the needs of the ongoing service incident, and match those needs with people who would be able to contribute to a conversation and help the agent. Individuals available to help in this way can be identified by a set of subject matter expert definitions 465. To facilitate selection of a subject matter expert by the routing module, these subject matter expert definitions 465 can use the same or similar structures used to define the agent profile information 450 and/or product information 410, e.g., expressed in the form of a product/category combination as described above. If defined in this way, the routing module 445, upon a request from the collaboration module 460, can select or identify a plurality of different potential subject matter experts by crawling up the tree(s) of the model defining the subject matter expert definitions to find the best matched skills for the current incident information when the agent requests collaboration.

Once this plurality of potential collaborators has been identified, the routing module 445 can then recommend these possible collaborators in a ranked order based on how well each collaborator's skills match the requirements of the incident. Other considerations upon which this ranking, or even inclusion in the list, may be based can include but are not limited to availability and/or current workload. According to one embodiment, skill levels defined in the subject matter expert definitions 465 can be set by users and/or administrators of the collaboration system 455, e.g., according to customer preference. Over time, the system can adjust these skill levels based on users' contributions to similar incidents. When the agent requires assistance and creates a conversation in the collaboration system 455, the collaboration module 4600 can recommend to the agent, based on the routing algorithm of the routing module 445 and the subject matter expert definitions, a list of users that can help, based on the strength of the match to the skill that would equate to the current incident information. In this way, the agent requiring assistance can get significantly better results by reaching out to people that are more likely to be able to help, based on their skills and track record of answering similar types of incidents.

Figure 5:
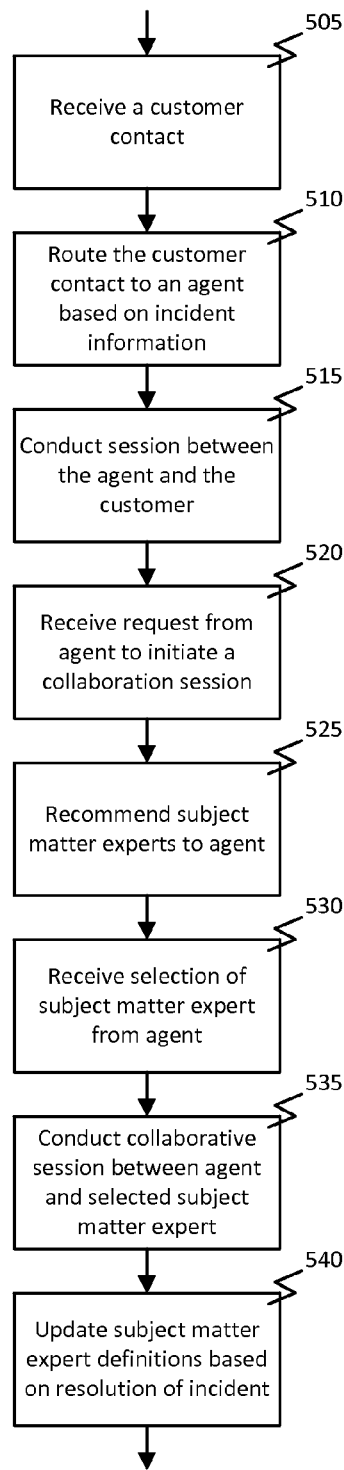
FIG. 5 is a flowchart illustrating a process for facilitating collaboration in a contact center according to one embodiment of the present invention.

FIG. 5 is a flowchart illustrating a process for facilitating collaboration in a contact center according to one embodiment of the present invention. As illustrated in this example, facilitating collaboration in a contact center can comprise initiating a session between a customer contact and a selected customer service agent in response to receiving 505 a request from the customer and routing 510 the customer contact to the selected agent. The customer service agent can be selected from a plurality of customer service agents based on incident information related to the request from the customer and skills information for each of the plurality of customer service agents. Once initiated, the session can be conducted 515 between the customer contact and the customer service agent as usual.

According to one embodiment, while conducting the session between the customer contact and the customer service agent, a request to collaborate with a subject matter expert can be received 520 from the customer service agent. In response to receiving 520 the request to collaborate with a subject matter expert, a recommendation can be made 525 to the customer service agent of a plurality of subject matter experts based on conducting the session between the customer contact and the customer service agent. Additional details of a process for recommending 525 subject matter experts will be described below with reference to FIG. 6. However, generally speaking, these recommendations can be based on current incident information and skills information defined for each subject matter expert. These subject matter experts can comprise a plurality of customer service agents and/or one or more users who are not customer service agents.

Once this recommendation has been made 525, a selection of one of the recommended subject matter experts can be received 530 from the customer service agent. In response to receiving the selection of one or more of the recommended subject matter experts, a collaborative session can be conducted 535 between the customer service agent and the selected one or more of the recommended subject matter experts while conducting the session between the customer contact and the customer service agent. Once the session between the customer contact and the customer service agent has been concluded, the skills information for the selected one or more of the recommended subject matter experts can be updated 540 based on a resolution of the session between the customer contact and the customer service agent.

Figure 6:
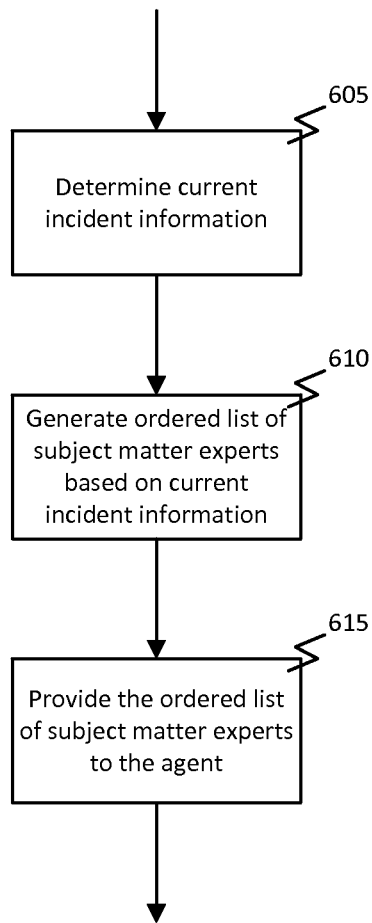
FIG. 6 is a flowchart illustrating a process for recommending subject matter experts according to one embodiment of the present invention.

FIG. 6 is a flowchart illustrating a process for recommending subject matter experts according to one embodiment of the present invention. As illustrated in this example, recommending to the customer service agent the plurality of subject matter experts based on conducting the session between the customer contact and the customer service agent can comprise determining 605 current incident information for the session based on conducting the session between the customer contact and the customer service agent. An ordered list of the plurality of subject matter experts can be generated 610 based on the current incident information for the session and skills information for each of the plurality of subject matter experts. The list can be ordered by a degree of match between the current incident information for the session and skills information for each of the plurality of subject matter experts. As noted above, a structure of incident information related to the request from the customer, a structure of the skills information for each of the plurality of customer service agents, a structure of the current incident information for the session, and a structure of the skills information for each of the plurality of subject matter experts are defined based on a structure of product information representing products or services for which support is available. Other considerations upon which this ranking, or even inclusion in the list, may be based can include but are not limited to availability and/or current workload. The ordered list of the plurality of subject matter experts can be provided 615 to the customer service agent.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums or memory devices, such as CD-ROMs or other type of optical disks, floppy diskettes, ROMs, RAMs, EPROMs, EEPROMs, magnetic or optical cards, flash memory, or other types of machine-readable mediums or memory devices suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for facilitating collaboration in a contact center, the method comprising:
    initiating a session between a customer contact and a customer service agent in response to a request from a customer, wherein the customer service agent is selected from a plurality of customer service agents based on incident information related to the request from the customer and skills information for each of the plurality of customer service agents;
    conducting the session between the customer contact and the customer service agent;
    receiving from the customer service agent, while conducting the session between the customer contact and the customer service agent, a request to collaborate with a subject matter expert;
    in response to receiving the request to collaborate with a subject matter expert, determining current incident information for the session including product/category information between the customer contact and the customer service agent;
    accessing a subject matter expert definition database in which a plurality of subject matter expert definitions are expressed as a product/category combination in a multi-level hierarchy;
    selecting from the subject matter expert definition database a plurality of subject matter experts based on the current incident information and a location of each of the subject matter experts in the multi-level hierarchy; and
    recommending to the customer service agent the plurality of subject matter experts.

2. The method of claim 1, wherein recommending to the customer service agent the plurality of subject matter experts based on conducting the session between the customer contact and the customer service agent further comprises:
generating an ordered list of the plurality of subject matter experts based on a degree of match between the current incident information for the session and skills information for each of the plurality of subject matter experts in the multi-level hierarchy; and
providing the ordered list of the plurality of subject matter experts to the customer service agent.

3. The method of claim 2, further comprising:
receiving from the customer service agent a selection of one of the recommended subject matter experts; and
in response to receiving the selection of one or more of the recommended subject matter experts, conducting a collaborative session between the customer service agent and the selected one or more of the recommended subject matter experts while conducting the session between the customer contact and the customer service agent.

4. The method of claim 3, further comprising updating the skills information for the selected one or more of the recommended subject matter experts based on a contribution of the subject matter expert to a resolution of the session between the customer contact and the customer service agent.

5. The method of claim 1, wherein the plurality of subject matter experts comprises a plurality of customer service agents.

6. The method of claim 1, wherein the plurality of subject matter experts comprises one or more users who are not customer service agents.

7. The method of claim 2, wherein a structure of incident information related to the request from the customer, a structure of the skills information for each of the plurality of customer service agents, a structure of the current incident information for the session, and a structure of the skills information for each of the plurality of subject matter experts are defined based on a structure of product information representing products or services for which support is available.

8. A system comprising:
a processor; and
a memory coupled with and readable by the processor and storing therein a set of instructions which, when executed by the processor, causes the processor to facilitate collaboration in a contact center by:
initiating a session between a customer contact and a customer service agent in response to a request from a customer, wherein the customer service agent is selected from a plurality of customer service agents based on incident information related to the request from the customer and skills information for each of the plurality of customer service agents;
conducting the session between the customer contact and the customer service agent;
receiving from the customer service agent, while conducting the session between the customer contact and the customer service agent, a request to collaborate with a subject matter expert;
in response to receiving the request to collaborate with a subject matter expert, determining current incident information for the session including product/category information between the customer contact and the customer service agent;
accessing a subject matter expert definition database in which a plurality of subject matter expert definitions are expressed as a product/category combination in a multi-level hierarchy;
selecting from the subject matter expert definition database a plurality of subject matter experts based on the current incident information and a location of each of the subject matter experts in the multi-level hierarchy; and
recommending to the customer service agent the plurality of subject matter experts.

9. The system of claim 8, wherein recommending to the customer service agent the plurality of subject matter experts based on conducting the session between the customer contact and the customer service agent further comprises:
generating an ordered list of the plurality of subject matter experts based on a degree of match between the current incident information for the session and skills information for each of the plurality of subject matter experts in the multi-level hierarchy; and
providing the ordered list of the plurality of subject matter experts to the customer service agent.

10. The system of claim 9, further comprising:
receiving from the customer service agent a selection of one of the recommended subject matter experts; and
in response to receiving the selection of one or more of the recommended subject matter experts, conducting a collaborative session between the customer service agent and the selected one or more of the recommended subject matter experts while conducting the session between the customer contact and the customer service agent.

11. The system of claim 10, further comprising updating the skills information for the selected one or more of the recommended subject matter experts based on a contribution of the subject matter expert to a resolution of the session between the customer contact and the customer service agent.

12. The system of claim 8, wherein the plurality of subject matter experts comprises a plurality of customer service agents.

13. The system of claim 8, wherein the plurality of subject matter experts comprises one or more users who are not customer service agents.

14. The system of claim 9, wherein a structure of incident information related to the request from the customer, a structure of the skills information for each of the plurality of customer service agents, a structure of the current incident information for the session, and a structure of the skills information for each of the plurality of subject matter experts are defined based on a structure of product information representing products or services for which support is available.

15. A non-transitory, computer-readable memory comprising a set of instructions stored therein which, when executed by a processor, causes the processor to facilitate collaboration in a contact center by:
initiating a session between a customer contact and a customer service agent in response to a request from a customer, wherein the customer service agent is selected from a plurality of customer service agents based on incident information related to the request from the customer and skills information for each of the plurality of customer service agents;
conducting the session between the customer contact and the customer service agent;

receiving from the customer service agent, while conducting the session between the customer contact and the customer service agent, a request to collaborate with a subject matter expert;

in response to receiving the request to collaborate with a subject matter expert, determining current incident information for the session including product/category information between the customer contact and the customer service agent;

accessing a subject matter expert definition database in which a plurality of subject matter expert definitions are expressed as a product/category combination in a multi-level hierarchy;

selecting from the subject matter expert definition database a plurality of subject matter experts based on the current incident information and a location of each of the subject matter experts in the multi-level hierarchy; and recommending to the customer service agent the plurality of subject matter experts.

16. The non-transitory, computer-readable memory of claim 15, wherein recommending to the customer service agent the plurality of subject matter experts based on conducting the session between the customer contact and the customer service agent further comprises:

generating an ordered list of the plurality of subject matter experts based on a degree of match between the current incident information for the session and skills information for each of the plurality of subject matter experts in the multi-level hierarchy; and providing the ordered list of the plurality of subject matter experts to the customer service agent.

17. The non-transitory, computer-readable memory of claim 16, further comprising:

receiving from the customer service agent a selection of one of the recommended subject matter experts; and in response to receiving the selection of one or more of the recommended subject matter experts, conducting a collaborative session between the customer service agent and the selected one or more of the recommended subject matter experts while conducting the session between the customer contact and the customer service agent; and updating the skills information for the selected one or more of the recommended subject matter experts based on a contribution of the subject matter expert to a resolution of the session between the customer contact and the customer service agent.

18. The non-transitory, computer-readable memory of claim 15, wherein the plurality of subject matter experts comprises a plurality of customer service agents.

19. The non-transitory, computer-readable memory of claim 15, wherein the plurality of subject matter experts comprises one or more users who are not customer service agents.

20. The non-transitory, computer-readable memory of claim 16, wherein a structure of incident information related to the request from the customer, a structure of the skills information for each of the plurality of customer service agents, a structure of the current incident information for the session, and a structure of the skills information for each of the plurality of subject matter experts are defined based on a structure of product information representing products or services for which support is available.

* * * * *